United States Patent

[11] 3,615,481

[72] Inventor Catharine E. Looney
Wilmington, Del.

[21] Appl. No. 825,966
[22] Filed May 19, 1969
[45] Patented Oct. 26, 1971
[73] Assignee E. I. du Pont de Nemours and Company
Wilmington, Del.

[54] LEUCO DYE/HEXAARYLBIIMIDAZOLE THERMALLY ACTIVATED IMAGING PROCESS
10 Claims, No Drawings

[52] U.S. Cl. .......... 96/48, 96/90
[51] Int. Cl. .......... G03c 5/24
[50] Field of Search .......... 96/90, 48

[56] References Cited

UNITED STATES PATENTS 3,445,234 5/1969 Cescon et al. .......... 96/90

*Primary Examiner*—Norman G. Torchin
*Assistant Examiner*—Won H. Louie, Jr.
*Attorney*—Gary A. Samuels

ABSTRACT: Process for imaging photosensitive color-forming compositions comprising selected leuco dyes, hexaarylbiimidazoles, and, optionally, a binder, which process comprises heating said composition to a temperature at which the composition becomes sufficiently fluid to permit fluid movement of the components of the composition, but below the decomposition temperature of the composition, and subjecting the composition to photoirradiation with activating light within the ultraviolet and visible regions. Preferably the binder is a thermoplastic polymer having a glass transition temperature above room temperature but below the decomposition temperature of the composition. In the alternative, the steps of the process may be reversed, i.e., the irradiation step may be carried out first, followed by heating as described above.

LEUCO DYE/HEXAARYLBIIMIDAZOLE THERMALLY ACTIVATED IMAGING PROCESS

BACKGROUND OF THE INVENTION

1. Field of the Invention

This invention relates to processes for imaging photosensitive color-forming hexaarylbiimidazole/leuco dye compositions by heating and by exposing to light.

2. Description of the Prior Art

Hexaarylbiimidazole/leuco dye compositions are known to form color on exposure to activating light. However, it is necessary to provide a small amount of solvent in order to obtain the fluidity necessary for the components to diffuse together to react. In other words, upon exposure to suitable irradiation, the biimidazole decomposes into imidazolyl radicals (for this reason the biimidazole is sometimes referred to as an imidazolyl dimer). The imidazolyl radical contacts the leuco dye and oxidizes it to its colored form. It is readily apparent then that the solvent provides a means for allowing movement of the imidazolyl radicals and the leuco dye so that they may react together. A disadvantage of these compositions is that they tend to form color on exposure to ambient sunlight or roomlight. Such color formation is undesirable since exposure to sunlight or roomlight is difficult to avoid in handling.

The present invention overcomes such handling difficulties by maintaining the hexaarylbimidazole/leuco dye composition in rigid relationship so that the components cannot diffuse together to react upon exposure to sunlight or roomlight. Preferably the two components are maintained in a solid binder to prevent their reacting together. Such compositions can the be handled in daylight or roomlight and can be irradiated to form color simply by heating them to a point where the binder softens and allows movement of the biimidazole and the leuco dye followed by irradiating.

Another disadvantage of such compositions is that once they are imaged by exposing them to activating light, they must be "fixed" to prevent obliteration of the image. Such fixing usually involves chemical treatment of the unimaged portions to prevent further color formation. However in the process of the present invention, fixing occurs merely by cooling the composition to a point where the binder again becomes rigid, thus causing the composition to become deactivated. Moreover, upon reheating followed by further irradiation, additional "add on" images can be formed.

SUMMARY OF THE INVENTION

Process for imaging photosensitive color-forming compositions consisting essentially of an admixture of 1. a 2,2',4,4',5,5' hexaarylbiimidazole wherein each aryl group contains up to 26 carbon atoms and is selected from carbocyclic or hetercyclic aromatic moieties, and
2. at least one dye in the leuco form which on oxidation forms a differently colored dye, with the proviso that when the resultant dye is cationic, there is also present an acid which forms a salt with the leuco form of the dye,
3. and optionally, a binder within which components (1) and (2) are dispersed;

which process comprises the steps of (*a*) heating said composition to a temperature which permits substantial color formation when the composition is subjected to photoirradiation effective to promote dye formation, and (*b*) subjecting said heated composition to photoradiation exposure effective to promote dye formation.

Steps (*a*) and (*b*) may be carried out simultaneously or in any order of sequence. Preferably step (*a*) is carried out first.

Preferably the binder is a thermoplastic polymer having a glass transition temperature above 25°–30° C. but below the decomposition temperature of the composition.

DESCRIPTION OF THE INVENTION

Hexaarylbiimidazoles dissociate to imidazolyl radicals upon exposure to light radiation rich in ultraviolet wavelengths.

When leuco dye compounds are intimately mixed with hexaarylbiimidazoles and the mixture subjected to such ultraviolet rays, the imidazolyl radicals formed oxidize the leuco dye to its colored form. This reaction can be depicted as follows:

1. $LL \rightleftharpoons 2L.$
2. $2L.+DH+H^+ \longrightarrow 2LH+D^+$ where LL represents a hexaarylbiimidazole, L. represents a triarylimidazolyl radical, DH is an oxidizable leuco dye, $D^+$ is the oxidized colored form of the dye and LH is the reduction product (a triarylimidazole). With suitable sensitizers, as discussed below, these imaging compositions can be activated with visible light.

Thus these compositions are useful as color imaging systems, especially in photoimaging applications since images can be formed by patternwise exposure to the photo radiation. It is convenient to disperse the compositions in a suitable binder (along with other ingredients such as fillers, visible light sensitizers, adhesives, thickeners and the like) and then cast the resulting composition as a coating on a substrate such as paper or film. Heretofore, it has usually been necessary to add a small amount of solvent to the composition to insure good imaging capabilities. The deficiencies of such a solvated or plasticized system have been explained above. The preferred process of this invention is directed to the imaging of such compositions by heating to soften them, followed by exposure to imaging radiation.

Before discussing the processes of this invention in greater detail the components of the compositions employed in the process will be discussed.

A. THE LEUCO DYE

This component of the photosensitive color-forming compositions described herein is the reduced form of the dye having one or two hydrogen atoms or other removable groups, the removal of which, together with an additional electron in certain cases produces the dye. Since the leuco form of the dye is essentially colorless, or in some instances it may be of a different color or of a less intense shade than the parent dye, it provides a means of producing an image when the leuco form is oxidized to the dye. This oxidation is accomplished by having present in intimate admixture with the leuco form of the dye a dimer of a 2,4,5-triarylimidazolyl radical (i.e., a hexaarylbiimidazole). The dimer of the imidazolyl radical is activated by light, normally ultraviolet wavelengths from abut 2,000A to about 4,200A, and when irradiated with such activating light, it splits into free imidazolyl radicals. These free radicals react with the leuco form of the dye to produce a colored image against a background of unirradiated and, therefore, unchanged material.

A large number of dyes in the leuco form have been found to be readily converted to the parent dye by free 2,4,5-triarylimidazolyl radicals by the above-described mechanism and are well adapted to provide new and useful image-forming compositions. Dyes in the leuco form which are operative according to the invention include aminotriarylmethanes, aminoxanthenes, aminothioxanthenes, amino-9,10-dihydroacridines, aminophenoxazines, aminophenothiazines, aminodihydrophenazines, aminodiphenylmethanes, leuco indamines, aminohydrocinnamic acids (cyanoethanes, leuco methines), hydrazines, leuco indigoid dyes, amino-2,3-dihydroanthraquinones, tetrahalo-p,p'-biphenols, 2(p-hydroxyphenyl)-4,5-diphenylimidazoles, phenethylanilines, 10-acylaminophenoxazines, 10-acylaminophenothiazines, 10-acylaminodihydrophenazines; or alkylthio, benzylthio-, 2-phenylhydrazino- and alkoxycarbonyl- derivatives of triphenyl-methane, and the like. These classes of leuco dyes are described in greater detail in Cescon & Dessauer U.S. application, Ser. No. 728,781, filed May 13, 1968; now U.S. Pat. No. 3,445,234 Cescon, Dessauer & Looney U.S. Pat. No. 3,423,427; Cescon, Dessauer & Looney U.S. application Ser. No. 290,583, filed June 26, 1963; now U.S. Pat. No. 3,449,379. Read U.S. Pat. No. 3,395,018 and Read U.S. Pat.

No. 3,390,997 describe leuco dyes having removable groups other than hydrogen.

The preferred leucos are the aminotriarylmethanes. Preferably the aminotriarylmethane is one wherein at least two of the aryl groups are phenyl groups having (*a*) an $R_1R_2N$- substituent in the position para to the bond to the methane carbon atom wherein $R_1$ and $R_2$ are each groups selected from hydrogen, $C_1$ to $C_{10}$ alkyl, 2-hydroxyethyl, 2-cyanoethyl, benzyl or phenyl, and (*b*) a group ortho to the bond to the methane carbon atom which is selected from lower alkyl, lower alkoxy, fluorine, chlorine, bromine, or butadienylene which when joined to the phenyl group forms a naphthalene ring; and the third aryl group, when different from the first two, is selected from thienyl, furyl, oxazylyl, pyridyl, thiazolyl, indolyl, indolinyl, benzoxazolyl, quinolyl, benzothiazolyl, penyl, naphthyl, or such aforelisted group substituted with lower alkyl, lower alkoxyl, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamido, $C_6$ to $C_{10}$ arylsulfonamido, nitro or benzylthio. Preferably the third aryl group is the same as the first two.

Particularly preferred aminotriarylmethanes have the following structural formula;

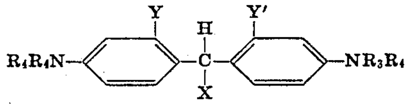

wherein $R_3$ and $R_4$ are selected from lower alkyl (preferably ethyl) or benzyl, Y and y' are lower alkyl (preferably methyl) and X is selected from

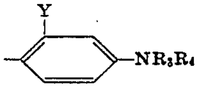

p-methoxphenyl, 2-thienyl, phenyl, 1-naphtyl, 2,3-dimethoxyphenxl, 3,4-methylene-dioxyphenyl, or p-benzothiophenyl. Preferable X is selected from

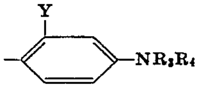

phenyl, 1-naphthyl, or p-benzothiophenyl.

Specific examples of the leuco dyes include:

*a*. Aminotriarylmethanes bis(4-amino-2-butylphenyl)(p-dimethylaminophenyl) methane
bis(4-amino-2-chlorophenyl)(p-aminophenyl)methane
bis(4-amino-3-chlorophenyl)(o-chlorophenyl)methane
bis(4-amino-3-chlorophenyl)phenylmethane
bis(4-amino-3,5-diethylphenyl)(o-chlorophenyl)methane
bis(4-amino--diethylphenyl)(o-ethoxyphenyl)methane
bis(4-amino-3,5-diethylphenyl)(p-methoxyphenyl)methane
bis(4-amino-3,5-diethylphenyl)phenylmethane
bis(4-amino-3-ethylphenyl)(o-chlorophenyl)methane
bis(p-aminophenyl)(4-amino-m-tolyl)methane
bis(p-aminophenyl)(o-chlorophenyl)methane
bis(p-aminophenyl)(p-chlorophenyl)methane
bis(p-aminophenyl)(2,4-dichlorophenyl)methane
bis(p-aminophenyl)(2,5-dichlorophenyl)methane
bis(p-aminophenyl)(2,6-dichlorophenyl)methane
bis(-p-aminophenyl)phenylmethane
bis(4-amino-o-tolyl)(p-chlorophenyl)methane
bis(4-amino-o-tolyl)(2,4-dichlorophenyl)methane
bis(p-anilinophenyl)(4-amino-m-tolyl)methane
bis(4-benzylamino-2-cyanophenyl)(p-aminophenyl)methane
bis(p-benzylethylaminophenyl)(p-chlorophenyl)methane
bis(p-benzylethylaminophenyl)(p-diethylaminophenyl)methane
bis(p-benzylethylaminophenyl)(p-dimethylaminophenyl)methane
bis(4-benzylethylamino-o-tolyl)(p-methoxyphenyl)methane
bis(p-benzylethylaminophenyl)-phenylmethane
bis(4-benzylethylamino-o-tolyl)(o-chlorophenyl)methane
bis(4-benzylethylamino-o-tolyl)(p-diethylaminophenyl)methane
bis(4-benzylethylamino-o-tolyl)(4-diethylamino-o-tolyl)methane
bis(4-benzylethylamino-o-tolyl)(p-dimethylaminophenyl)methane
bis[2-chloro-4-(2-diethylaminoethyl)ethylaminophenyl](o-chlorophenyl)methane
bis[p-bis(2-cyanoethyl)aminophenyl]phenylmethane
bis[p-(2-cyanoethyl)ethylamino-o-tolyl](p-dimethylaminophenyl)methane
bis[p-(2-cyanoethyl)methylaminophenyl](p-diethylaminophenyl)methane
bis(p-dibutylaminophenyl)[p-(2-cyanoethyl)methylaminophenyl]methane bis(p-dibutylaminophenyl)(p-diethylaminophenyl)methane
bis(4-diethylamino-2-butoxyphenyl)(p-diethylaminophenyl)methane
bis(4-diethylamino-2-fluorophenyl)o-tolylmethane
bis(p-diethylaminophenyl)(p-aminophenyl)methane
bis(p-diethylaminophenyl)(4-anilino-1-naphthyl)methane
bis((p-diethylaminophenyl)(m-butoxyphenyl)methane
bis(p-diethylaminophenyl)(o-chlorophenyl)methane
bis(p-diethylaminophenyl)(p-cyanophenyl)methane
bis(p-deithylaminophenyl)(2,4-dichlorophenyl)methane
bis(p-diethylaminophenyl(4-diethylamino-1-naphthyl)methane
bis(p-diethylaminophenyl)(p-dimethylaminophenyl)methane
bis(p-diethylaminophenyl)(4-ethylamino-1-naphthyl)methane bis(p-diethylaminophenyl)2-naphthylmethane bis(p-diethylaminophenyl)(p-nitrophenyl)methane
bis(p-diethylaminophenyl)2-pyridylmethane
bis(p-diethylamino-m-tolyl)(p-diethylaminophenyl)methane
bis(4-diethylamino-o-tolyl)(0-chlorophenyl)methane
bis(4-diethylamino-o-tolyl)(p-diethylaminophenyl)methane
bis(4-diethylamino-o-tolyl)(p-diphenylaminophenyl)methane
bis(4-diethylamino-o-tolyl)phenylmethane
bis(4-dimethylamino-2-bromophenyl)phenylmethane
bis(p-dimethylaminophenyl)(4-anilino-1-naphthyl)methane
bis(p-dimethylaminophenyl)(p-butylaminophenyl)methane
bis(p-dimethylaminophenyl)(p-sec. butylethylaminophenyl)methane
bis(p-dimethylaminophenyl)(p-chlorophenyl)methane
bis(p-dimethylaminophenyl)(p-diethylaminophenyl)methane
bis(p-dimethylaminophenyl)(4-dimethylamino-1-naphthyl)methane
bis(p-dimethylaminophenyl)(6-dimethylamino-m-tolyl)methane
bis(p-dimethylaminophenyl)(4-dimethylamino-o-tolyl)methane
bis(p-dimethylaminophenyl)(4-ethylamino-1-naphthyl)methane
bis(p-dimethylaminophenyl)(p-hexyloxyphenyl)methane
bis(p-dimethylaminophenyl)(p-methoxyphenyl)methane
bis(p-dimethylaminophenyl)(5-methyl-2-pyridyl)methane
bis(p-dimethylaminophenyl)2-quinolylmethane
bis(p-dimethylaminophenyl) o-tolylmethane
bis(p-dimethylaminophenyl)(1,3,3-trimethyl-2-indolinylidenemethyl)methane bis(4-dimethylamino-o-tolyl)(p-aminophenyl)methane
bis(4-dimethylamino-o-tolyl)(o-bromophenyl)methane
bis(4-dimethylamino-o-tolyl)(o-cyanophenyl)methane
bis(4-dimethylamino-o-tolyl)(o-fluorophenyl)methane
bis(4-dimethylamino-o-tolyl) 1-napthylmethane
bis(4-dimethylamino-o-tolyl)phenylmethane
bis(p-ethylaminophenyl)(o-chlorophenyl)methane
bis(4-ethylamino-m-tolyl)(o-methoxyphenyl)methane
bis(4-ethylamino-m-tolyl)(p-methoxyphenyl)methane
(4-ethylamino-m-tolyl)(p-dimethylaminophenyl)methane
bis(4-ethylamino-m-tolyl)(p-hydroxyphenyl)methane
bis[4-ethyl(2-hydroxyethyl)amino-m-tolyl](p-diethylaminophenyl)methane
bis]p-(2-hydroxyethyl)aminophenyl](o-chlorophenyl)methane
bis[p-(bis(2-hydroxyethyl)aminophenyl](4-diethylamino-o-tolyl)methane
bis[p-(2-methoxyethyl)aminophenyl]phenylmethane
bis(p-methylaminophenyl)(o-hydroxyphenyl)methane
bis(p-propylaminophenyl)(m-bromophenyl)methane
tris(4-amino-o-tolyl)methane
tris(4-anilino-o-tolyl)methane
tris(p-benzylaminophenyl)methane
tris[4-bis(2-cyanoethyl)amino-o-tolyl]methane
tris[p-(2-cyanoethyl)ethylaminophenyl]methane
tris(p-dibutylaminophenyl)methane
tris(p-di-n-butylaminophenyl)methane
tris(4-diethylamino-2-chlorophenyl)methane tris(p-diethylaminophenyl)methane
tris(4-diethylamino-o-tolyl)methane
tris(p-dihexylamino-o-tolyl)methane
tris(4-dimethylamino-o-tolyl)methane
tris(p-hexylaminophenyl)methane
tris[p-bis(2-hydroxyethyl)aminophenyl]methane
tris(p-methylaminophenyl)methane
tris(p-dioctadecylaminophenyl)methane
tris(4diethylamino-2-fluorophenyl)methane
tris(4-dimethylamino-2-fluorophenyl)methane
bis(2-bromo-4-diethylaminophenyl)phenylmethane,
bis(2-butoxy-4-diethylaminophenyl)phenylmethane,
bis(4-diethylamino-o-tolyl)(p-methoxyphenyl)methane,
bis(4-diethylamino-2-methoxyphenyl)(P-nitrophenyl)methane,
bis(4-diethylamino-1-naphthyl)(4-diethylamino-o-tolyl)methane,
bis(4-diethylamino-o-tolyl) 1-naphthylmethane,
bis(4-diethylamino-o-tolyl)phenylmethane,
tris(4-dimethylamino-2-chlorophenyl)methane,
bis(4-dimethylamino-2,5-dimethylphenyl)phenylmethane,
bis(4-dimethylamino-o-tolyl)(o-bromophenyl)methane,
bis(4-ethylbenzylamino-o-tolyl)(p-methoxyphenyl)methane,
tris(p-dioctylamino-o-tolyl)methane,
bis(4-diethylamino-o-tolyl)-4-methoxy-1-naphthyl methane
bis(4-diethylamino-o-tolyl)-3,4,5-trimethoxyphenyl methane
bis(4-diethylamino-o-tolyl)-p-hydroxyphenyl methane
5-[bis(4-diethylamino-o-tolyl)-methyl]-2,3-cresotic acid
4-[bis(4-diethylamino-o-tolyl)-methyl]-phenol
4-[bis(4-diethylamino-o-tolyl)-methyl]-acetanilide
4-[bis(4-diethylamino-o-tolyl)-methyl]-phenylacetate
4-[bis(4-diethylamino-o-tolyl)-methyl]-benzoic acid
4-[bis(4-diethylamino-o-tolyl)-methyl]-diphenyl sulfone
4-[bis(4-diethylamino-o-tolyl)-methyl]-phenylmethyl sulfone
4-[bis(4-diethylamino-o-tolyl)-methyl]-methylsulfonanilide
4-[bis(4-diethylamino-o-tolyl)-methyl]-p-tolylsulfonanilide
bis(4-diethylamino-o-tolyl)-p-nitrophenyl methane
bis(4-diethylamino-o-tolyl)(2-diethylamino-4-methyl-5-thiazolyl) methane
bis(4-diethylamino-o-tolyl)(2-diethylamino-5-methyl-6-benzoxazolyl) methane
bis(4-diethylamino-o-tolyl)(2-diethylamino-5-methyl-6-benzothiazolyl) methane
bis(4-diethylamino-o-tolyl)(1-ethyl-2-methyl-3-indolyl) methane
bis(4-diethylamino-o-tolyl)(1-benzyl-2-methyl-3-indolyl) methane
bis(4-diethylamino-o-tolyl)(1-ethyl-2-methyl-5-methoxyl-3-indolyl)methane
bis(1-o-xylyl-2-methyl-3-indolyl)(4-diethylamino-o-tolyl)methane
bis(4-diethylamino-o-tolyl)(1-ethyl-5-indolinyl)methane
bis(1-isobutyl-6-methyl-5-indolinyl)(4-diethylamino-o-tolyl)methane
bis(4-diethylamino-o-tolyl)(8-methyl-9-julolindinyl)methane
bis(4-diethylamino-2-acetamidophenyl)(4-diethylamino-o-tolyl)methane 4-[bis(4-diethylamino-o-tolyl)methyl]-N-ethylacetanilide
bis[4-(1-phenyl-2,3-dimethyl-5-pyrazolinyl)](4-diethylamino-o-tolyl)methane
bis(4-diethylamino-o-tolyl)(7-diethylamino-4-methyl-3-coumarinyl)methane
bis(4-diethylamino-o-tolyl)(4-acrylamidophenyl)methane
bis(4-diethylamino-o-tolyl)(p-benzylthiophenyl)methane
bis(4-diethylamino-o-tolyl)(4-isopropylthio-3-methylphenyl)methane
bis(4-diethylamino-o-tolyl)(4-chlororbenzylthiophenyl)methane
bis(4-diethylamino-o-tolyl)(2-furyl)methane
bis(4-diethylamino-o-tolyl)(3,4-methylenedioxyphenyl)methane
bis(4-diethylamino-o-tolyl)(3,4-dimethoxyphenyl)methane
bis(4-diethylamino-o-tolyl)(3-methyl-2-thienyl)methane
bis(4-diethylamino-o-tolyl)(2,4-dimethoxyphenyl)methane
bis[4-(2-cyanoethyl)(2-hydroxyethyl)amino-o-tolyl]-(p-benzylthiophenyl)methane,
bis[4-(2-cyanoethyl)(2-hydroxyethyl)amino-o-tolyl]-2-thienylmethane,
bis(4-dibutylamino-o-tolyl)2-thienylmethane,
bis(4-diethylamino-2-ethylphenyl)(3,4-methylene-dioxyphenyl)methane,
bis(4-diethylamino-2-fluorophenyl)(p-benzylthiophenyl)methane,
bis(4-diethylamino-2-fluorophenyl)(3,4-methylene-dioxyphenyl)methane,
bis(4-diethylamino-o-tolyl)(p-methylthiophenyl)methane,
bis(4-diethylamino-o-tolyl)2-thienylmethane,
bis(4-dimethylamino-2-hexylphenyl)(p-butylthiophenyl)methane,
bis[4-(N-ethylanilino)-o-tolyl](3,4-dibutoxyphenyl)methane,
bis[4-bis(2-hydroxyethyl)amino-2-fluorophenyl](p-benzylthiophenyl)methane,
bis(4-diethylamino-o-tolyl)-p-chlorophenyl methane,
bis(4-diethylamino-o-tolyl)-p-bromophenyl methane,
bis(4-diethylamino-o-tolyl)-p-fluorophenyl methane,
bis(4-diethylamino-o-tolyl)-p-tolyl methane,
bis(4-diethylamino-o-tolyl)-4-methoxy-1-naphthyl methane,
bis(4-diethylamino-o-tolyl)-3,4,5-trimethoxyphenyl methane,
bis(4-diethylamino-o-tolyl)-p-hydroxyphenyl methane,
bis(4-diethylamino-o-tolyl)-3-methylthienyl methane.

*b.* Aminoxanthenes 3-amino-6-dimethylamino-2-methyl-9-(o-chlorophenyl)xanthene
3-amino-6-dimethylamino-2-methyl-9-phenylxanthene
3-amino-6-dimethylamino-2-methylxanthene
3,6-bis(diethylamino)-9-(o-chlorophenyl)xanthene
3,6-bis(diethylamino)-9-hexylxanthene
3,6-bis(diethylamino)-9-(o-methoxycarbonylphenyl)xanthene
3,6-bis(diethylamino)-9-methylxanthene
3,6-bis(diethylamino)-9-phenylxanthene
3,6-bis(diethylamino)-9-o-tolylxanthene
3,6-bis(dimethylamino)-9-(o-chlorophenyl)xanthene 3,6-bis(dimethylamino)-9-ethylxanthene
3,6-bis(dimethylamino)-9-(o-methoxycarbonylphenyl)xanthene
3,6-bis(dimethylamino)-9-methylxanthene.
In addition to the above-listed aminoxanthenes the leuco forms of the xanthene dyes identified by the following Color Index numbers may be used, 45000, 45005, 45010, 45015, 45050, 45070, 45090, 45095, 45100, 45105, 45150.
*c.* Aminothioxanthenes
3,6-bis(dimethylamino)-9-(o-ethoxycarbonylphenyl)thioxanthene
3,6-bis(dimethylamino)-9-(o-methoxycarbonylphenyl)thioxanthene
3,6-bis(dimethylamino)thioxanthene
3,6-dianilino-9-(o-ethoxycarbonylphenyl)thioxanthene
*d.* Amino-9,10-dihydroacridines
3,6-bis(benzylamino)-9,10-dihydro-9-methylacridine
3,6-bis(diethylamino)-9-hexyl-9,10-dihydroacridine
3,6-bis(diethylamino)-9,10-dihydro-9-methylacridine
3,6-bis(diethylamino)-9,10-dihydro-9-phenylacridine
3,6-diamino-9-hexyl-9,10-dihydroacridine
3,6-diamino-9,10-dihydro-9-methylacridine
3,6-diamino-9,10-dihydro-9-phenylacridine
3,6-bis(dimethylamino)-9-hexyl-9,10-dihydroacridine
3,6-bis(dimethylamino)-9,10-dihydro-9-methylacridine.
Also included are the leuco forms of the acridine dyes having CI numbers 46000, 46005B, 46010, 46015, 46020, 46025, 46030, 46035, 46040, 46055, 46060, 46065, 46070, 46075, 46080.

*e.* Aminophenoxazines
3,7-bis(diethylamino)phenoxazine
9-dimethylamino-benzo[a]phenoxazine
and the leuco forms of phenoxazine dyes having CI numbers 51000, 51180, 51185, 51190, 51195.
*f.* Aminophenothiazines
3,7-bis(benzylamino)phenothiazine and the leuco form of phenothiazine dyes having CI numbers 52000, 52010, 52015, 52020, 52025, 52030, 52035, 52050.
*g.* Aminodihydrophenazines
3,7-bis(benzylethylamino)-5,10-dihydro-5-phenylphenazine
3,7-bis(diethylamino)-5-hexyl-5,10-dihydrophenazine
3,7-bis(dihexylamino)-5,10-dihydrophenazine
3,7-bis(dimethylamino)-5-(p-chlorophenyl)-5,10-dihydrophenazine
3,7-diamino-5-(o-chlorophenyl)-5,10-dihydrophenazine
3,7-diamino-5,10-dihydrophenazine
3,7-diamino-5,10-dihydro-5-methylphenazine
3,7-diamino-5-hexyl-5,10-dihydrophenazine
3,7-bis(dimethylamino)-5,10-dihydrophenazine
3,7-bis(dimethylamino)-5,10-dihydro-5-phenylphenazine
3,7-bis(dimethylamino)-5,10-dihydro-5-methylphenazine
Also included are the leuco forms of the phenazine dyes having CI numbers 50035, 50040, 50045, 50200, 50205, 50206, 50210, 50216, 50220, 50225, 50235, 50240.
*h.* Aminodiphenylmethanes
1,4-bis[bis-p(diethylaminophenyl)methyl]piperazine
bis(p-diethylaminophenyl)anilinomethane
bis(p-diethylaminophenyl)-1-benzotriazolylmethane
bis(p-diethylaminophenyl)-2-benzotriazolylmethane
bis(p-diethylaminophenyl)(methylamino)methane
bis(p-diethylaminophenyl)(octadecylamino)methane - benzotriazolymethane
bis(p-diethylaminophenyl)(p-chloroanilino)methane
bis(p-diethylaminophenyl)2,4-dichloroanilino)methane
bis(p-diethylaminophenyl)(methylamino)methane
bis(p-diethylaminophenyl)(octadecylamino)methane
bis(p-dimethylaminophenyl)aminomethane
bis(p-dimethylaminophenyl)anilinomethane
1,1-bis(diemthylaminophenyl)ethane
1,1-bis(dimethylaminophenyl)heptane
bis(4-methylamino-m-tolyl)aminoethane.
*i.* Leuco indamines
4-amino-4'-dimethylaminodiphenylamine
p-(p-dimethylaminoanilino)phenol
and the leuco forms of indamine and indophenol dyes having CI numbers 49400, 49405, 49410, 49700.
*j.* Aminohydrocinnamic acids (cyanoethanes, leuco methines)
4-amino-α,β-dicyanohydrocinnamic acid, methyl ester
-anilino-α,β-dicyanohydrocinnamic acid, methyl ester
4-(p-chloroanilino)-α,β-dicyanohydrocinnamic acid, methyl ester
α-cyano-4-dimethylaminohydrocinnamamide
α-cyano-4-dimethylaminohydrocinnamic acid, methyl ester
α,β-dicyano-4-diethylaminohydrocinnamic acid, methyl ester
α,β-dicyano-4-dimethylaminohydrocinnamamide
α,β-dicyano-4-dimethylaminohydrocinnamic acid, methyl ester
α,62 -dicyano-4-dimethylaminohydrocinnamic acid
α,β-dicyano-4-dimethylaminohydrocinnamic acid, hexyl ester
α,β-dicyano-4-ethylaminohydrocinnamic acid, methyl ester
α,β-dicyano-4-hexylaminohydrocinnamic acid, methyl ester
α,62 -dicyano-4-methylaminocinnamic acid, methyl ester
p-(2,2-dicyanoethyl)-N,N-dimethylaniline
4-methoxy-4'-(1,2,2-tricyanoethyl)azobenzene
4-(1,2,2-tricyanoethyl)azobenzene
p-(1,2,2-tricyanoethyl)-N,N-dimethylaniline
substituted hydrocinnamic acids which are the leuco forms of dyes having CI numbers 48000, 48001, and 48005.

*k.* Hydrazines
1-(p-diethylaminophenyl)-2-(2-pyridyl)hydrazine
1-(p-dimethylaminophenyl)-2-(2-pyridyl)hydrazine
1-(3-methyl-2-benzothiazolyl)-2-(4-hydroxy-1-naphthyl)hydrazine
1-(2-naphthyl)-2-phenylhydrazine
1-p-nitrophenyl-2-phenylhydrazine
1-(1,3,3-trimethyl-2-indolinyl)-2-(3-N-phenylcarbamoyl-4-hydroxy-1-naphthyl)hydrazine
*l.* Leuco indigoid dyes
The leuco forms of indigoid dyes having CI numbers 73000, 73015, 73025, 73030, 73035, 73040, 73045, 73050, 73055, 73060, 73065, 73070, 73085, 73090, 73110, 73300, 73305, 73310, 73315, 73320, 73325, 73335, 73340, 73345, 73350, 73360.

*k*-dihydroanthraquinone *m.* Amino-2,3-dihydroanthraquinones
1,4-dianilino-2,3-dihydroanthraquinone
1,4-bis(ethylamino)-2,3-dihydroanthraquinone
and leuco forms of dyes bearing CI numbers 61100, 61105, 61107, 61116, 61120, 61140, 61500, 61505, 61510, 61515, 61520, 61525, 61530, 61535, 61540, 61545, 61565, 61650.
*p.* Phenethylanilines
N-(2-cyanoethyl)-p-phenethylaniline
N,N-diethyl-p-phenylethylaniline

B. THE HEXAARYLBIIMIDAZOLE

The hexaarylbiimidazoles are 2,4,5-triarylimidazolyl dimers that are dissociable to the corresponding triarylimidazolyl radicals wherein the aryl groups may be the same or different, carbocyclic or heterocyclic, substituent free or bearing substituents that do not interfere with the dissociation step and the subsequent oxidation of the oxidizable substrate.

The hexaarylbiimidazoles can be represented as the dimers of 2,4,5-triarylimidazolyls of the formula

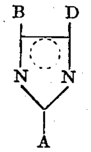

wherein A, B, and D are aryl radicals, as previously defined.

The hexaarylbiimidazoles can also be represented by the formula

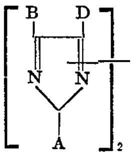

wherein A, B and D stand for aryl radicals described above. Upon dissociation, the dimer forms the corresponding 2,4,5-triarylimidazolyl radical. The B and D groups can normally carry 0–3 substituents, the A group 0–4 substituents.

The aryl groups include one- and two-ring aryls, such as phenyl, biphenyl, naphthyl, pyridyl, furyl and thienyl. Suitable inert substituents on the aryl groups have Hammett sigma (para) values in the −0.5 to 0.8 range and are other than hydroxyl, sulfhydryl, amino, alkylamino or dialkylamino. Preferably, these inert substituents are free of Zerewitinoff hydrogen, i.e., have no hydrogens reactive toward methyl magnesium iodide. Representative substituents and their sigma values, (relative to H=0.00), as given by Jaffe, Chem. Rev. 53, 219–233 (1953) are: methyl (−0.17), ethyl (−0.15), t-butyl (−0.20), phenyl (0.01), butoxy (−0.32), phenoxy (−0.03), fluoro (0.06), chloro (0.23), bromo (0.23), iodo (0.28), methylthio (−0.05), nitro (0.78), ethoxycarbonyl (0.52), and cyano (0.63). The foregoing substituents are preferred; however, other substituents which may be employed include trifluoromethyl (0.55), chloromethyl (0.18), carboxyl (0.27), cyanomethyl (0.01), 2-carboxyethyl (−0.07), and methylsulfonyl (0.73). Thus, the substituents may be halogen, cyano, lower hydrocarbyl (including alkyl, halo alkyl, cyanoalkyl, hydroxyalkyl and aryl), lower alkoxy, aryloxy, lower alkylthio, arylthio, sulfo, alkyl sulfonyl, arylsulfonyl, and nitro, and lower alkylcarbonyl. In the foregoing list, alkyl groups referred to therein are preferably of one to six carbon atoms, while aryl groups referred to therein are preferably of six to ten carbon atoms.

Preferably the aryl radicals are carbocyclic, particularly phenyl, and the substituents have Hammett sigma values in the range −0.4 to +0.4, particularly lower alkyl, lower alkoxy, chloro, fluoro, bromo and benzo groups.

In a preferred biimidazole class, the 2 and 2′ aryl groups are phenyl rings bearing an ortho substituent having a Hammett sigma value in the range −0.4 to +0.4. Preferred ortho substituents are fluorine, chlorine, bromine, methyl and methoxy groups; especially chloro. Such dimers tend less than other dimers to form color when the light-sensitive compositions are applied to and dried on substrates at somewhat elevated temperatures, e.g. in the range 70°–100° C.

Most preferably, the 2-phenyl ring carries only the above-described ortho group, and the 4- and 5-phenyl rings are either unsubstituted or substituted with lower alkoxy.

Representative dimers of the imidazolyl radicals other than those given in the examples which fall within the scope of the invention are listed below, in terms of the substituents of the aryl groups when aryl is phenyl and in terms of other aryl groups than phenyl, by way of illustrating the activatable imidazolyl dimers which may be employed in the composition.

I. Phenyl substituted imidazolyl radicals

Substituents of phenyl rings attached at

| 2-Position | 4-Position | 5-Position |
|---|---|---|
| — | — | — |
| o-acetoxy | — | — |
| o-benzyl | — | — |
| o-benzylthio | o-benzylthio | o-benzylthio |
| p-[4,5-bis(p-methoxy-phenyl)-2-imidazolyl] | — | — |
| o-bromo | p-bromo | — |
| o-bromo | o-methoxy | o-methoxy |
| 2-bromo-4-phenyl | — | — |
| o-n-butoxy | — | — |
| N-butylacetamido | — | — |
| o-butylthio | — | — |
| p-t-butylthio | — | — |
| o-butyryloxy | — | — |
| o-chloro | — | — |
| o-chloro | o-chloro | o-chloro |
| o-chloro | p-chloro | — |
| o-chloro | p-chloro | p-chloro |
| o-chloro | 3,4-dichloro | — |
| o-chloro | p-methoxy | — |
| o-chloro | m-pentyloxy | — |
| o-chloro | m-pentyloxy | m-pentyloxy |
| o-chloro | m-methoxy | m-methoxy |
| o-chloro | p-propionyloxy | — |
| 2-chloro-4-phenyl | — | — |
| 2-chloro-4-methoxy | — | — |
| p-chloro | p-chloro | p-chloro |
| o-cyano | — | — |
| o-cyano | p-t-butyl | — |
| o-cyano | p-t-butyl | p-t-butyl |
| o-cyano | p-cyano | p-cyano |
| o-cyano | p-methoxy | p-methoxy |
| 2,3-dibromo | — | — |
| 2,4-dibromo | — | — |
| 2,6-dibutyl | — | — |
| o-dibutylsulfamoyl | — | — |
| 2,4-dichloro | o-bromo | — |
| 2,6-dichloro | — | — |
| 2,6-dichloro | p-butoxy | p-butoxy |
| 3,4-dichloro | 2,4-dimethoxy | — |
| 2,4-dicyano | p-cyano | p-cyano |
| 2,6-dicyano | — | — |
| 3,5-dicyano-4-methoxy | — | — |
| p-(2,2-dicyanovinyl) | — | — |
| 2,4-diethoxy | — | — |
| o-diethylsulfamoyl | — | — |
| 2,5-difluoro | p-cyano | — |
| 2,5-difluoro | p-cyano | p-cyano |
| 2,3-dimethoxy | — | — |
| 2,4-dimethoxy | o-chloro | — |
| 2,4-dimethoxy | o-chloro | o-chloro |
| 2,4-dimethoxy | 2,4-dimethoxy | — |
| 2,4-dimethoxy | 2,4-dimethoxy | 2,4-dimethoxy |
| 2,4-dimethoxy | o-methoxy | — |
| 2,4-dimethoxy | p-methoxy | — |
| 2,4-dimethoxy | p-methoxy | p-methoxy |
| 2,4-diemthoxy | m-phenylthio | — |
| 2,4-dimethoxy | m-phenylthio | m-phenylthio |
| 3,4-dimethoxy | o-cyano | — |
| 3,4-dimethoxy | 2,4-dipentyl | 2,4-dipentyl |
| 2,4-dimethoxy | — | — |
| o-dimethylcarbamoyl | — | — |
| 2,4-dipentyl | 2,4-dipentyl | 2,4-dipentyl |
| p-(4,5-diphenyl-2-imidazolyl) | — | — |
| p-[4-(4,5-diphenyl-2-imidazolyl)phenyl] | — | — |
| 2,4-dipropoxy | — | — |
| 2,4-dinaphthyl thio | — | — |
| nitro | m-methoxy | m-methoxy |
| 2-nitro-5-methoxy | — | — |
| 2,4-dipropoxy | o-diethylcarbamoyl | — |
| o-dipropylcarbamoyl | — | — |
| p-ethoxy | — | — |
| p-ethoxy | p-diethylsulfamoyl | — |
| o-ethoxycarbonyl | — | — |
| o-ethyl | — | — |
| o-N-ethylbutyramido | — | — |
| o-ethylthio | — | — |
| o-N-ethylvaleramido | p-t-pentyl | p-t-pentyl |
| o-fluoro | o-methoxy | o-methoxy |
| p-hexyloxy | p-methoxy-carbonyl | p-methoxycarbonyl |
| o-methoxy | — | — |
| o-methoxy | p-chloro | — |
| o-methoxy | o-methylthio | o-methylthio |
| o-methoxy | p-nitro | — |
| o-methoxy | p-nitro | p-nitro |
| o-methoxy | p-phenylsulfonyl | — |
| o-methoxy | p-phenylsulfonyl | p-phenylsulfonyl |

| | | |
|---|---|---|
| p-methoxy | p-benzylthio | p-benzylthio |
| p-methoxy | m-butyryloxy | m-butyryloxy |
| p-methoxy | 2-chloro-4,5-dimethoxy | 2-chloro-4,-5-dimethoxy |
| p-methoxy | m-dimethyl-carbamoyl | — |
| o-methoxycarbonyl | | — |
| o-methoxycarbonyl | p-N-ethylphenyl sulfamoyl | — |
| p-methoxycarbonyl | — | — |
| 4-methoxy-3-nitro | — | — |
| 2-methoxy-4-phenyl | — | — |
| o-methyl | p-benzoyloxy | p-benzoyloxy |
| o-methyl | o-methyl | o-methyl |
| m-N-methylacetamido | p-methoxy | p-methoxy |
| o-N-methylacetamido | o-N-ethylbutyr-amido | o-N-ethylbutyr-amido |
| o-N-methylacetamido | o-N-methylacet-amido | o-N-methylacet-amido |
| o-N-methylacetamido | o-N-methylacet-amido | o-N-methylacet-amido |
| o-N-Nmethylpropion amido | — | — |
| o-methylthio | — | — |
| p-methylthio | p-methoxy | p-methoxy |
| p-methylthio | p-methylthio | — |
| p-methylthio | p-methylthio p-phenoxy | p-methylthio o-1- |
| o-2-naphthyl | — | |
| m-nitro | 2,4-dimethoxy | 2,4-dimethoxy |
| m-nitro | 2,4-dimethylthio | — |
| o-t-pentyl | — | — |
| p-pentyl | — | — |
| o-pentyloxy | — | — |
| p-pentyloxy | — | — |
| o-pentyloxycarbonyl | — | — |
| o-phenoxy | — | |
| o-phenoxy | 3,4,5-trimethoxy | 3,4,5-trimethoxy |
| p-phenoxy | p-methoxy | — |
| m-phenyl | p-phenyl | p-phenyl |
| o-phenyl | — | — |
| o-phenyl | p-methoxycarbonyl | p-methoxy |
| o-phenyl | m-pentyloxycarbonyl | — |
| o-phenyl | m-pentyloxycarbonyl | m-entyloxycarbonyl |
| o-phenyl | p-phenyl | p-phenyl |
| p-phenyl | p-phenyl | p-phenyl |
| p-phenylhydroazono methyl | — | |
| o-phenylthio | p-1-naphthylthio | p-1-naphthylthio |
| p-phenylthio | p-methoxy | p-methoxy |
| o-propoxy | — | |
| 2,4,6-tribromo | — | |
| 2,4,6-tributyl | — | |
| 2,4,6-tri-methyl | — | — |
| 2,3,5-trichloro | — | — |
| 2,4,6-trichloro | — | — |
| 2,4,6-trichloro | o-butylthio | — |
| 2,4,6-tricyano | p-cyano | p-cyano |
| 2,4,6-triethoxy | — | — |
| p-trifluromethoxy | — | — |
| 2,3,4-trimethoxy | — | — |
| 2,4,6-trimethoxy | — | — |
| 3,4,5-trimethoxy | — | |
| 3,4,5-trimethyl | 3,4,5-trimethyl | 3,4,5-trimethyl |
| 2,4,6-tripropoxy | — | — |
| — | o-t-butoxy | — |
| — | p-butoxy | — |
| — | 4-t-butoxy-2-methoxy | — |
| — | p-t-butyl | — |
| — | p-t-butylthio | p-t-butylthio |
| — | o-chloro | 2,5-dimethoxy |
| — | 2-chloro-4-methoxy | — |
| — | 2-cyano-2,4-dimethoxy | — |
| — | 2,3-dichloro | 2,4-dimethylthio |
| — | 2,4-dimethoxy | — |
| — | 2,4-dimethoxy | 2,4,5-trimethoxy |
| — | 2,5-dimethyl | 2,5-dimethyl |
| — | 2,5-dipentyl | — |
| — | o-methoxy | o-methoxy |
| — | o-methoxy | p-methoxy |
| — | 4-methoxy-3-nitro | 2-methoxy-4-methyl |
| — | o-methyl | 2,4,5-trimethoxy |
| — | p-methyl | — |
| — | p-methylthio | — |
| — | p-methylthio | p-methylthio |
| — | p-pentyl | — |
| — | p-t-pentyloxy | p-t-pentyloxy |
| — | 2,4,5-trimethoxy | p-methoxy |
| — | 2,4,5-trimethyl | — |

II Other ring groups than phenyl in imidazolyl radical

| 2-Position | 4-Position | 5-Position |
|---|---|---|
| 2,4-dipentylphenyl | 2-naphthyl | 2-naphthyl |
| p-methoxyphenyl | 2-naphthyl | 2-naphthyl |
| o-methoxycarbonyl phenyl | 2-naphthyl | phenyl |
| (1-methoxy-2-naphthyl) | phenyl | phenyl |
| (3-methoxy-2-naphthyl) | phenyl | phenyl |
| 1-naphthyl | phenyl | phenyl |
| o-pentyloxycarbonyl-phenyl | 2-naphthyl | 2-naphthyl |
| 3-pyridyl | phenyl | phenyl |

The above dimers of 2, 4, 5-triarylimidazolyl radicals which provide light-activated components for the invention compositions are characterized by the property of dissociating into two triarylimidazolyl free radicals when illuminated with ultraviolet light of the aforementioned wavelength. Such a dissociation may be detected, and the existence of the free radicals discerned, by electron paramagnetic resonance, by ultraviolet spectra, and by visible spectra.

The triarylimidazoles which are intermediates for the biimidazoles or dimers of the 2, 4, 5-triarylimidazolyl radicals are prepared as follows.

A. By refluxing, in glacial acetic acid containing ammonium acetate, benzil, a related compound such as a binaphthoyl or a naphthylphenylglyoxal, or an appropriately substituted compound of the benzil type with an aromatic aldehyde such as benzaldehyde, naphthaldehyde, a phenanthraldehyde or with picolinaldehyde, a nicotinaldehyde, a thiophenecarboxaldehyde or a suitably substituted aldehyde of these types. The reaction product is precipitated by drawing the reaction mass, e.g., in water or in an ammonium hydroxide solution, and is recovered by filtration. The product can then be purified by recrystallization from a solvent This procedure is described by Davidson et al., J. Org. Chem. 2, (1937).

B. By refluxing a benzoin and one of the above-mentioned aldehydes in methanol in the presence of copper acetate and ammonia This is an adaptation of the procedure of Wiedenhagen et al., Ber 70, 570 (1937)

C. By heating a benzil or above-named related compound with an aforementioned aldehyde at 180° to 190° C. in formamide solution as disclosed in Belgian Pat. No. 589,417.

The intermediate triarylimidazole is dissolved in ethanol containing potassium hydroxide and then oxidized to the corresponding biimidazole or dimer of the triarylimidazolyl radical by treatment with aqueous potassium ferricyanide. The desired product precipitates from the reaction mixture, is isolated by filtration, and is washed free from ferricyanide with water. This procedure is described by Hayashi et al., Bull. Chem. Soc. Japan. 33. 565 (1960). The triarylimidazole may also be oxidized by agitating a benzene or chloroform solution of the imidazole with lead dioxide ($PbO_2$or by passing a saturated solution of the imidazole in benzene through a column packed with $PbO_2$ and diatomaceous earth.

These dimers exist in isomeric forms which are differentiated by the manner in which the radicals composing the dimers are linked together and which exhibit different spectral and thermotropic properties.

The preferred method, involving oxidative dimerization of the corresponding triarylimidazole with ferricyanide in alkali, generally yields the 1, 2'-biimidazoles, although other isomers, such as the 1,1'1 4°,2,2',2,4' and 4,4'-biimidazoles are sometimes also obtained admixed with the 1,2'-isomer. For the purposes of this invention, it is immaterial which isomer is employed so long as it is photodissociaLble to the triarylimidazolyl radicals which are the effective oxidizing agents of the invention compositions.

C. THE LEUCO DYE/HEXAARYLBIIMIDAZOLE ADMIXTURE

The hexaarylbiimidazoles are phototropic, i.e., they change color upon exposure to suitable radiation and return to their original color after the radiation source is removed. They may by virtue of this property contribute some color to the image that is produced when a leuco dye composition containing a biimidazole is irradiated. This color is, however, fugitive. It fades at varying rates depending upon the substituent group in the biimidazole, and is not relied upon to color the image produced by radiation. The leuco dye component provides the permanent colored image when reacted upon by the free radicals of the biimidazole when the biimidazole is activated, e.g., by ultraviolet light. THe primary purpose of the biimidazole, them, is to furnish a photosensitive material which, upon radiation, is activated to react with the leuco dye to develop color in accordance with the pattern of an irradiated area.

The hexaarylbiimidazoles are also thermally dissociable to triarylimidazolyl radicals. Hence in the practice of the process of this invention, care is usually taken not to heat the composition to such decomposition temperatures. Moreover, the binder, when present, must be selected, as further described below, to soften or become plastic at a temperature lower than such decomposition temperature of the biimidazole. However, hexaarylbiimidazoles which thermally dissociate at room temperature or below may be used in this invention. The solid binder which rigidifies the composition prevents the imidazolyl radicals from contacting the leuco dye until the composition is heated to softening of the binder. In this embodiment the heat- and light-induced color-forming reactions may occur simultaneously on heating and irradiating according to the method of the invention described herein. Here too, the preferred leucos have the preferred structure set forth above. Here too, the activating heat applied at Tg and above should be applied patternwise for image production.

The leuco dye and the hexaarylbiimidazole may be mixed in mole ratios within the range from about 10:1 (leuco dye: dimer) to about 1:10 The preferred ratio range is 2:1 to 1:2 the preferred ratio about 1:1 Such mixtures in the presence or absence of binder as described herein will produce a permanent image when heated irradiated with ultraviolet light.

D. ACIDS FOR LEUCO DYE SALT FORMATION

With the leuco form of dyes which have amino or substituted amino groups within the dye structure and which are characterized as cationic dyes, an amine salt-forming mineral acid, organic acid, or an acid from a compound supplying acid is employed. The amount of acid usually varies from 0.33 mole to 1 mole per mole or amino nitrogen in the dye. The preferred quantity of acid is about 0.5 to 0.9 mole per mole of amino nitrogen. Acid in an amount in excess of that required to form a salt with the amino nitrogen should be avoided because excess acid reduces the reactivity of the light-activated biimidazole and renders the composition less light-sensitive. Representative acids which form the required amine salts are hydrochloric, hydrobromic, sulfuric, nitric, phosphoric, acetic, oxalic, p-toluenesulfonic, (trichloroacetic, trifluoroacetic and perfluoroheptanoic acid.

Other acids such as acids in the "Lewis" sense or acid sources which may be employed in the presence of water or moisture include zinc chloride, zinc bromide, and ferric chloride.

With the leuco form of dyes which produce dyes by the removal of two hydrogen atoms, acid is not needed and in most cases should be avoided to prevent desensitizing the light-sensitive composition.

E. BINDERS

Although the binder can be any binder that softens or melts to allow movement of the biimidazole and leuco dye molecules within the range of temperatures between room temperature and the decomposition temperature of the composition, i.e., the dissociation temperature of the biimidazole component, the binder is preferably one that has a glass transition temperature within such range of temperatures. In addition, the preferred binder is one that is rigid below its glass transition temperature, for reasons described previously. By "rigid" is meant generally that the binder is sufficiently stiff to prevent substantial color formation by preventing biimidazole/leuco molecules from diffusing together.

Such binders are normally solvent-soluble (for casting compositions), substantially amorphous thermoplastic solids, which may be homo- or copolymers, or mixtures thereof, provided Tg (glass transition temperature) is in the range defined below. The term "binder" as used herein includes polymeric compositions containing other components, including plasticizers and other polymers with Tg values lower or higher than the desired value, provided the composition as a whole has Tg as defined and the composition is otherwise inert to the imaging components.

Representative suitable binders with Tg in degrees centigrade are: poly(vinylacetate) 30°, poly(n-propyl acrylate) 35°, poly(chlorotrifluoroethylene) (chlorotrifluoroethylene) 45°, poly(ethyl methacrylate) 65°, poly(vinyl chloride) 82°, polystyrene 100°, poly(methylmethacrylate) 105°, poly(methacrylonitrile) 120°, poly formal) 105°, poly(vinylacetal) 82°, poly(vinyl butyral) 49°, cellulose triacetate 105°, cellulose acetate butyrate 50°, ethyl cellulose 43°, ethylene/vinyl acetate copolymers 28° to 85°, cellulose acetate butyrate 135°, 25 percent ethyl acrylate/75 percent methyl methacrylate copolymer 59°, 2 percent methyl acrylate/31 percent 2-ethylhexylacrylate/67 percent methyl methacrylate copolymer 52°, 0.5 percent methyl acrylate/39.5 percent methyl methacrylate/60 percent n-butyl methacrylate copolymer 57°; poly-(n-butyl methacrylate) 22°, and poly(vinyl pyrrolidone) 86°.

Tg may vary with polymer average molecular weight, molecular weight distribution, and the presence of diluents such as solvents and plasticizers. Diluents which lower Tg adversely or which cause the polymer to lose its rigidity should be avoided. Sometimes, however, plasticizers may be advantageously used depending on the binder, to give flexibility to the inactive compositions when coated on substrates or to reduce viscosity in the photoimaging region above Tg. The quantity (usually not more than 10 percent by weight of the binder) should be controlled so as not to depress Tg below the desired level or to otherwise interfere with the deactivated or activated physical states. The binder composition may also contain inert infusible filler such as titanium dioxide, organo philic colloidal silica, bentonite, powdered glass, and also heat-absorbing materials to facilitate the heat activation step such as graphite and flake metal, in minor, noninterfering amounts.

F. THE PROCESS OF THE INVENTION

The compositions described above that are employed in the processes of this invention are in a state of deactivation against light-induced color formation. This state, as described above, is obtained by maintaining the compositions below the temperature at which they soften and become sufficiently fluid to permit the imaging reactants to diffuse together for color-forming reaction. Below this deactivation temperature the binder component (including binder-plasticizer combinations), if present, becomes a rigid solid, e.g., a hard glass and the imaging component are effectively "locked in, " i.e., prevented from diffusing together for reaction.

The process of this invention loosens the molecular packing in the imaging compositions so as to permit photoimaging. This is accomplished by heating the composition to melting while irradiating with ultraviolet light. It will be understood by those skilled in the art that polymers preferred as binders herein exhibit two important melting temperatures. The first (lowest temperature) "melting" that occurs is at the glass transition temperature, Tg, where the polymer undergoes a marked increase in its thermal expansion coefficient and changes from a normally hard glass to a soft liquidlike mass, accompanied by a large decrease in viscosity. Thermodynamic melting occurs at a higher temperature, Tm, where the residual crystalline regions of the polymer composition break up and melt (that is, the X-ray patterns characteristic of crystals disappear). Tg is generally less than about two-thirds Tm and greater than about one-half Tm, in degrees Kelvin. In other words, such polymers showing a Tg and a Tm are substantially amorphous in the solid state, i.e., are supercooled liquids. Where Tg is not known, the temperature at which the molten material changes on cooling to a brittle glass, the brittle temperature, may be taken as transition temperature as these are generally within a few degrees of each other.

The melting of the imaging compositions display for thermal activation may be glass transition or true melting. With most binders (thermoplastic, amorphous) it is not necessary to heat the composition above the binder's Tm. Between Tg and Tm the composition is sufficiently fluid for light-induced imaging according to the invention. With binders that crystallize photography, at or just below Tm, so that there is substantially little or no supercooled liquidlike fluid region between Tm and Tg, the composition's activation and deactivation temperatures may lie in the vicinity of Tm rather than in the vicinity of the lower Tg. Preferably Tg in the amorphous polymeric binders is in the range 30° to 130° C., most preferably 50° to 110° C. Such binders are normally used in amounts of from 3 to 15 parts per part of the leuco dye and biimidazole combined, to provide compositions inactive towards light-induced imaging at room temperatures but active for photoimaging at or above Tg. The photoimaging temperature is preferably 20° to 50° C. Above Tg, since imaging speed increases with increasing temperature and decreasing viscosity.

Temperatures for thermally activating the color-forming compositions may vary from well below 0° C. to as high as about 150° C., depending on the leuco dye, the hexaarylbiimidazole, and the presence or absence of such other formulation components as the binder, as discussed above. Heating to the conversion temperature for imaging may be effected in several ways. Substrate bearing the imaging composition can be passed around a heated bar or between heated squeeze rolls. Ovens may be used when heating large objects. Infrared lamps are also suitable. With heat lamps that also generate imaging wavelengths of light, the compositions may be simultaneously heat activated and photoimaged. Thermographic methods of reproduction are also satisfactory for heating in a graphic pattern.

Any convenient source of activating light may be used with the light-sensitive compositions to induce the formation of an image. In general, light sources that supply radiation in the region between about 2,000 A. and about 4,200 A. are useful in producing images with the leuco dye hexaarylbiimidazole-solvent compositions on numerous substrates. Among the light sources which have been employed are sun lamps, electronic flash guns, germicidal lamps, ultraviolet lamps providing specifically light of short wavelength (2,537A.) and lamps providing light of long wavelength (2,537A.). Visible light sources may be used when the compositions also contain sensitizers described below, that are responsive to visible light and transfer absorbed energy to the biimidazole. The light exposure time will vary from a fraction of a second to several minutes depending upon the intensity of the light, its distance from the light-sensitive composition, the nature and amount of the light-sensitive composition available, and the intensity of color in the image desired. There may also be used coherent light beams, for example, pulsed nitrogen lasers, argon ion lasers and ionized Neon II lasers, whose emissions fall within or overlap the ultraviolet absorption bands of the triarylimidazolyl dimer.

In another embodiment of the process of this invention, the composition is photoirradiated first, while it is still rigid, i.e., at a nonactivating temperature, normally below the glass (Tg) temperature of the binder, if present, then substantially immediately the composition is heated, without further light exposure necessary, to an activating temperature, Tg or above, whereupon leuco dye oxidation and color formation occur.

For image production, the light or the heat or both can be applied according to the desire pattern. The hexaarylbiimidazoles photodissociate to triarylimidazolyl radicals even when they are substantially immobilized in the solvent-free substantially rigid compositions. The radicals produced in the rigid matrix are likewise trapped and eventually, in the absence of the light stimulus, recombine to form hexaarylbiimidazoles. The triarylimidazolyl radicals are relatively long lived, as more fully described in Cescon British Pat. No. 997,396, and copending U.S. application, Ser. No. 622,085, filed 3/10/67. Thus, on raising the rigid light-irradiated composition to a fluidizing temperature before the concentration of radicals has decreased to a level too low to produce visible color on reaction with leuco dye, the remaining radicals can diffuse apart and react with leuco dye, forming visible dye color.

By "substantially immediately" then, is meant before the triarylimidazolyl radical concentration has decreased to a nonpermanent color-forming level. The actual time may vary from a second or so to several minutes, depending on such factors as the hexaarylbiimidazole and its concentration, the recombination rate of the corresponding triarylimidazolyl radicals, the intensity of the activating light (in general the more intense the light the greater the number of radicals formed), the leuco dye, its concentration and its rate of reaction with the triarylimidazolyl radicals, and the extinction coefficient of the resulting dye.

G. PREPARATION OF COMPOSITIONS USED IN THE PROCESS

A common procedure is to dissolve a leuco dye ranging in concentration from about 0.5 percent by weight to the solubility limit in a volatile solvent, and to add a hexaarylbiimidazole in an amount equivalent on a molar basis to the leuco dye. Optionally, a binder as described above may also be added to the solution. The leuco dye selected depends upon the color and quantity of the image desired. Two or more leuco dyes may be used in combination to obtain a particular color or shade of color to provide a neutral gray or black image.

In applying a solution to paper, films, fabrics, or to the surfaces of rigid substances such as glass, wood or metals the solution may be sprayed, brushed, applied by a roller or an immersion coater, flowed over the surface, picked up by immersion or spread by other means. Complete coverage of the substrate may be attained or a pattern of the light-sensitive composition may be printed on the substrate. In impregnating paper, for instance, such concentrations of solutions and pickup by the paper are made so as to provide from about 0.01 mg./in.$^2$ to about 5.0 mg./in.$^2$ of leuco dye and the equivalent amount of biimidazole activator. Images of greater and lesser intensity of color are provided by the application of greater and lesser amounts of leuco dye to the substrate. For coating roll papers and films there may be there may such typical devices for continuously laying down wet films as nip fed three roll reverse roll coating heads, gravure coaters, trailing blade coater and Mayer bar coating heads (wherein the coating thickness is controlled by a threaded or a wire wound bar). The wet thickness is adjusted such that the dry thickness after solvent removal is in the desired range (about 0.1–1.5 mil, usually around 0.3–0.5 mil on paper, 0.8–1.1 mil on film).

The substrates bearing the solution of the leuco dye and biimidazole, and optionally the binder, may be dried simply by allowing the solvent to evaporate at room temperature. They also may be dried under vacuum at room temperatures, as by radiant heating at atmospheric or reduced pressures, as discussed under solvents. Volatile solvents such as methanol, ethanol, acetone, and the like may be removed from the compositions and from cellulosic substrates readily and substantially completely enough to reduce the photosensitivity of the composition to the desired low levels by simple drying at ordinary temperatures. On the other hand N,N-dimethylformamide, N,N-diethylacetamide, and dimethylsulfoxide tend to be so strongly held that prolonged heating under vacuum is often necessary for their complete removal. Other volatile solvents which may be used include 1-propanol, 2-propanol, n-butanol, -propanol, acetate, ethyl acetate, benzene, toluene, methyl ethyl ketone, 3-pentanone, methylene chloride, chloroform, 1, 1, 2-trichloroethane, tetrahydrofuran, dioxane, and mixtures thereof in various proportions as may be required to dissolve the various components selected for use in the composition.

The compositions may also contain sensitizers that extend the spectral sensitivity of the imaging system to longer wavelengths. Sensitizers include (a) hydroxyphthalein dyes such as fluorescein, the eosins, the phloxines, the erythrosins, rose bengal, and others disclosed in U.S. application, Ser. No. 654,720, filed 7/20/67, and assigned to the assignee herein, (b) acridine dyes, particularly 3, 6-bis(alkylamino) acridines such as 3, 6-bis(dimethylamino)acridine hydrochloride, 3,6-bis(diethylamino)-acridine hydrochloride, 2, 7-dimethyl-3, 6-bis -bis(ethylamino)-acridine hydrochloride, 2,7-dimethyl-3, 6-bis(diethylamino)-acridine hydrochloride, 3, 6-bis(diethylamino)-10-methyl acridinium methanesulfonate and others disclosed in U.S. application Ser. No. 654,721, filed 7/2./67 and assigned to the assignee herein, (c) carbocyanine dyes such as 3,3′-diethyl oxacarbocyanine iodide, 3,3′-diethyl-9-methyl oxacarbocyanine iodide, applications 9-trimethyl oxacarbocyanine iodide, 3,3′-diethyl-4,5,4′, 5′-dibenzoxacarbocyanine p-toluene sulfonate, 3,3′-diethyl oxaselenacarbocyanine iodide, 3,3′-di-n-butyl-9-methylthiacarbocyanine iodide, 3,3′ -diethyl thiaselenacarbocyanine iodide, and 3,3′-diethyl selenacarbocyanine iodide, and others disclosed in U.S. application, Ser. No. 654,676, filed 7/20/67, now U.S. Pat. No. 3,554,753 and assigned to the assignee herein, (d) coumarins such as 7-dimethyl-amino-4methylcoumarin, 7-dimethylamino-4-butylcoumarin, 7-diethylamino-4-ethylcoumarin, and others disclosed in U.S. application, Ser. No. 622,526, filed Mar. 13, 1967 now U.S. Pat. No. 3,533,797, and assigned to the assignee herein, and (e) aminophenylketones such as p-dimethylaminobenzophenone, p,p-bis(dimethylamino)benzophenone, p,p′-bis(diethylamino)benzophenone and others disclosed in U.S. application, Ser. No. 654,677, filed 7/20/67, and assigned to the assignee herein. For sensitized imaging, sensitizers of classes *a*, *b* and *c* above are generally used in amounts ranging from about 0.01 to 0.1 mole, preferably 0.01–0.05 mole, per mole of the biimidazole; those of classes *d* and *e* above in amounts ranging from about 0.1 to 2 moles, preferably 0.4 to 0.6 mole per mole of the biimidazole. The pertinent portions of the aforementioned applications are incorporated herein by reference.

Substrates include paper ranging from tissue paper to heavy cardboard; films of plastics and polymeric materials such as regenerated cellulose, cellulose acetate, cellulose nitrate, polyester of glycol and terephthalic acid, vinyl polymers and copolymers, polyethylene, polyvinylacetate, polymethyl methacrylate, polyvinylchloride; textile fabrics; glass, wood and metals. Opaque as well as transparent substrates can be used. Substrates which bear the photosensitive components as a coating on the reverse side of the substrate, i.e., on the side away from the ultraviolet light source used for image formation, should be transparent not only in the visible region but transparent to a portion of the ultraviolet range useful for image formation.

H. USE

The processes of this invention are broadly useful for optical printing and anywhere it is desirable to capture images as in photography, pattern making, reproducing written, printed, drawn or typed matter, and recording radiation signals as line graphics, alphanumerics or other characters. The applied heat and light radiations can be passed through stencils, negatives or transparencies including halftone and continuous tone negative and positives in contact with or projected onto the radiation-sensitive image-fix composition; or, the activating and imaging radiations can be reflected for impingement on the radiation-sensitive material from printed or typed copy or objects that are opaque or transmit radiation poorly. Multiple copies can be made using a single imaging exposure by stacking radiation transparent assemblies comprising the imaging composition coated on a transparent substrate such as UV-transparent film, paper or glass and maintaining the assembly at the activating temperature while irradiating. The ultimately desired dye optical density pattern can be constructed stepwise, according to one or more patterns, by exposing previously unexposed areas to suitable heat and light radiation and/or by reexposing previously underexposed areas (i.e., areas wherein the maximum obtainable optical density has not yet been fully developed) to one or more additional heat and light exposures. Such "add on" capability and versatility of the invention compositions is particularly useful in recording information and creating electronically generated displays and graphics.

I. EXAMPLES

EXAMPLE 1

750 mg. of polymethylmethacrylate having a Tg of about 100° C. was dissolved under agitation with warming in excess acetone. This solution was combined with 0.9 ml. of a 0.1 molar tris(2-methyl-4-diethylaminophenyl)methane solution in acetone, 0.6 ml. of a 0.3 molar p-toluene-sulfonic acid solution in acetone, and 1.8 ml. of a 0.05 molar 2,2′-(o-chlorophenyl)-4, 4′,5, 5′-tetrakis(m-methoxphenyl)biimidazole solution in acetone. The resulting solution was the concentrated to a volume of about 15 ml., cast to a 5 mil wet thickness on 5 mil thick Mylar polyester film, allowed to air dry for 5 minutes, then heated for 1 minute under an IR lamp to complete the acetone evaporation.

The coated film was substantially colorless. After contact flashing with a xenon lamp 5 times consecutively at 25° C. it was still substantially colorless. It was then heated on a hot plate to about 105° C. and again contact flashed 5 times, whereupon it developed a strong blue color.

Another portion of unexposed film was contact flashed 5 times at 105° C. through a standard silver negative to obtain a blue positive print. This print was unaltered on cooling to room temperature and exposing it to the contact flash.

The xenon flashlamp used above is available as HiCo lite and emits ultraviolet and visible light approximating sunlight at a high intensity of about 1×10$^5$ milliwatts/cm$^2$ for about 0.001 second flash duration. EXAMPLE EXAMPLE 2

Example 1 was repeated with the following materials: 170 mg. of polymethylmethacrylate in excess acetone, 0.5 ml. of dimethyl phthalate, 0.9 ml. of 0.1 molar tris(2-methyl-4-diethylaminophenyl)methane in acetone, 1.2 ml. of 0.3 molar p-toluenesulfonic acid in acetone, and 3.6 ml. of 0.05 molar 2,2′-(o-chlorophenyl)-4,4,5,5′-tetrakis(m-methoxyphenyl)biimidazole in acetone. The acetone solution was concentrated to 10 ml., coated to a 5 mil thickness on 1.0 mil thick polyester film, and allowed to air dry overnight at about 25° C. in the dark.

A section of the air dried film was contact flashed 3 times with the xenon lamp at room temperature. Only a faint blue color developed. Another section was heated to 105° C. and contact flashed twice. A deep blue color developed. Blue, room temperature-stable, positive prints were obtained on contact flashing through a silver negative at 105° C.

Example 3

A coating solution was prepared from the ingredients tabulated below:

| Ingredient | Quantity, g. |
|---|---|
| Acetone | 24.0 |

| | |
|---|---|
| poly(methylmethacrylate) as "Lucite" 140, Tg= about 100° C. | 5.2 |
| 2,2'-(o-Chlorophenyl)-4,4',5,5' tetrakis(m-methoxyphenyl) biimidazole | 0.56 |
| p-Chlorophenyl-bis(2-methyl-4-diethylaminophenyl)methane | 0.16 |
| p-Toluenesulfonic acid monohydrate | 0.14 |

The solution was coated on film as described in example 1 and allowed to air dry for 2 hours. Contact flashing 5 times with the xenon lamp through a silver negative produced no color at room temperature but produced a dark green print at 100° C.

Examples 4–7

Coating compositions were prepared from the following:

| Ingredient | % by Weight |
|---|---|
| Acetone | 83.00 |
| Binder as described below | 14.00 |
| 2,2'-(o-chlorophenyl)-4,4', 5, 5'-tetrakis(m-methoxyphenyl) biimidazole | 1.50 |
| tris(2-methyl-4-diethylaminophenyl)-methane | 0.70 |
| p-Toluenesulfonic acid monohydrate | 0.80 |

The solutions were coated on bleached sulfite paper at 50° C. to evaporate the acetone and give 0.6 mil thick dry coatings having a dry coating weight of 0.9 lb./100 ft.[2]

Samples of the coated papers were irradiated through a stencil with the high intensity UV xenon lamp (1 flash) at 50° C. and at 100° C. The results are tabulated below:

| | | Image Optical Density | |
|---|---|---|---|
| Example | Binder (a, b) | at 50° | at 100° |
| 4 | Poly(methyl methacrylate), Tg=100° | 0.28 | 0.46 |
| 5 | 2% Methyl acrylate/31% 2-ethylhexyl acrylate/ 67% methyl methacrylate copolymer, Tg= | 0.20 | 0.61 |
| 52° | | | |
| 6 | 0.5% Methyl acrylate/ 39.5% methyl methacrylate/60% n-butyl methacrylate, Tg=57° | 0.18 | 0.54 |
| 7 | The polymer of example 6 plus 7-diethylamino-4-methyl coumarin, 0.22% by wt. | 0.17 | 1.11 |
| the | coating composition, as sensitizer | | |

(a) Tg was determined by differential thermal analysis (b) The copolymer compositions are in percent by weight The unexposed areas of the imaged papers developed little or no color on subsequent exposure to the xenon lamp at room temperature. In addition, all the above-coated papers were found to have a high degree of stability towards ambient light at room temperatures as determined by exposure to fluorescent desk lamps and low intensity ultraviolet from a Blacklight Blue Lamp.

Examples 8–11

Coated papers were prepared as described in examples 4–7 using binders as tabulated below. Samples of the coated papers were irradiated under the tabulated conditions with a Blacklight Blue Lamp emitting low intensity ultraviolet light (0.75 milliwatts/cm²). The exposure results are expressed below as increase in reflectance optical density (OD) over the unexposed material.

| | | O.D. Increase | | |
|---|---|---|---|---|
| Example | Binder | 25° 40 sec. | 50° 40 sec. | 65° 10 sec. |
| 8 | Poly(methyl methacrylate, Tg=100° | 0.05 | 0.12 | — |
| 9 | 25% ethyl acrylate/75% methyl methacrylate copolymer, Tg=59° | 0.07 | | 0.26 |
| 10 | poly(vinyl acetate), tg=30° | 0.05 | 0.35 | 0.35 |
| 11 | Cellulose acetate butyrate, filtered grade EAB 531-1, Tg=135° | 0.07 | 0.07 | — |

The results show that in general the binder compositions are relatively inactive towards light induced color formation at low temperatures and that color development increases with increasing temperatures. The formulations of examples 8 and 11 require heating at temperatures in the vicinity of the binder Tg to develop high color optical densities on photoirradiation.

Example 12

The following coating composition was prepared:

| Ingredient | % by Weight |
|---|---|
| Acetone | 82.9 |
| Poly(vinylacetate) (Tg=30° C.) | 13.96 |
| 2,2'-(o-chlorophenyl)-4,4',5,5'-tetrakis(m-methoxyphenyl) biimidazole | 1.43 |
| tris(2-methyl-4-diethylaminophenyl) methane | 0.70 |
| p-Toluenesulfonic acid monohydrate | 0.80 |
| 7-Diethylamino-4-methyl coumarin | 0.22 |

The solution was coated on bleached sulfite paper at 50° C. to evaporate the acetone and give a 0.6 mil thick dry coating having a dry coating weight of 0.9 lb./100 ft.[2].

Samples of the coated paper were irradiated at 25°, 50° and 75° C. with a Blacklight Blue Lamp (low intensity UV, 0.75 milliwatts/cm² for 10 seconds, with the following results expressed as increase in reflectance optical density (OD).

| Temp., °C. | O.D. Increase |
|---|---|
| 25 | 0.03 (substantially colorless) |
| 50 | 0.34 (blue) |
| 75 | 0.55 (deeper blue) |

The coated paper is thus shown essentially inactive for ultraviolet light-induced color formation below the binder's glass transition temperature, but readily activated above this temperature. The higher the temperature, the greater the color development.

In control experiments it is observed that all the coated compositions described in the above examples produce strong dye color on being irradiated with the activating light source at 20°–25° C. before the carrier solvent has been substantially completely evaporated.

Examples 13–14

Coating compositions were prepared as described in example 4 except that tris(4-dimethylaminophenyl)methane (Crystal Violet) and tris(2-fluoro-4-diethylaminophenyl)methane (F-dye) were employed as the leuco dye.

The compositions were coated on "Mylar" polyester film as described in example 1. Samples of the coated films were exposed to Black Lamp Blue Light irradiation at the temperatures and times tabulated below, with the following results expressed as increase in the transmission optical density over the unexposed film.

O.D. Increase

| Example | Leuco Dye | 25° 40 sec. | 50° 10 sec. | 50° 40 sec. |
|---|---|---|---|---|
| 13 | Crystal Violet | 0.19 | 0.21 | 0.36 |
| 14 | F-Dye | — | 0.07 | 0.26 |

These leuco dyes tend to form color rapidly in these formulations, particularly at elevated temperatures and longer exposures, useful where high color development is required with low intensity light.

Example 15

A coated paper was prepared essentially as described in example 12.

A portion was exposed through a stencil to ultraviolet light from the Blacklight Blue lamp, 7 inches from the surface, for 30 seconds at 25° C. Substantially no color developed in the light-struck areas. Then, within 15 seconds, the sample was placed on a hot plate which in a few seconds raised the paper's temperature to 75° C., whereupon a definite blue color (reflectance OD=0.22) appeared in the light struck areas, but not in the unexposed areas.

In comparison, heating the unexposed coated paper to 75° C. and irradiating at the same time at the same light exposure conditions developed a somewhat deeper blue image (reflectance OD=0.34), indicating that in the latent imaging experiment a substantial proportion though not all of the trapped triarylimidazolyl radicals that formed during irradiation of the solid composition at 25° C., still remained uncombined and free to react with the leuco dye at the higher, fluidizing temperature. That the fluidity of the medium is controlling in the above system can be demonstrated by wetting the coated surface with acetone and irradiating as above at 25° C., whereupon a definite blue image appears in the wetted, i.e., plasticized, irradiated areas.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for imaging photosensitive color-forming compositions which comprises a. heating a composition consisting essentially of an admixture of 1. a 2,2',4,4',5,5'-hexaarylbiimidazole wherein each aryl group contains up to 26 carbon atoms and is selected from carbocyclic or heterocyclic aromatic moieties, 2. at least one dye in the leuco form having one or two removable hydrogens or other removable groups, the removal of which forms a differently colored dye with the proviso that when the resultant dye is cationic, there is also present an acid which forms a salt with the leuco form of the dye, and 3. an amorphous thermoplastic binder within which components (1) and (2) are dispersed, to an activation temperature above the glass transition temperature of the binder but below the decomposition temperatures of components (1) and (2), said composition being substantially free of solvents, and b. subjecting said composition, while at said activating temperature, to photoradiation exposure effective to induce color formation.

2. A process which comprises the process of claim 1, followed by the additional step of c. cooling said heated and radiated composition to a temperature below the temperature specified in step (a) of claim 1.

3. The process of claim 1 wherein the hexaarylbiimidazole is a hexaphenylbiimidazole in which the phenyl groups can contain noninterfering substituents which have Hammett sigma values in the −0.5 to +0.8 range;

the dye in the leuco form is selected from aminotriarylmethanes, aminoxanthenes, aminothioxanthenes, amino-9,10-dihydroacridines, aminophenoxazines, aminophenothiazines, aminodihydrophenazines, aminodiphenylmethanes, leuco indamines, aminohydrocinnamic acids, hydrazines, leuco indigoid dyes, amino-2,3-dihydroanthraquinones, tetrahalo-p,p'-biphenols, 2(p-hydroxyphenyl)-4,5-diphenylimidazoles, or phenethylanilines, and the binder is an amorphous thermoplastic polymer.

4. Process for imaging photosensitive color-forming compositions which comprises a. heating a composition consisting essentially of an admixture of 1. a 2,2',4,4',5,5',5,5'wherein the 2 and 2' phenyl groups each bear one ortho substituent selected from fluorine, chlorine, bromo, methyl and methoxy; and the 4,4',5 and 5' phenyl groups are each either unsubstituted or bear one substituent selected from lower alkyl, lower alkoxy, chloro, fluoro, bromo or benzo;

2. at least one aminotriarylmethane dye in the leuco form wherein at least two of the aryl groups are phenyl groups having (a) an $R_1R_2N$-substituted in the position para to the bond to the methane carbon atom wherein $R_1$ and $R_2$ are each groups selected from hydrogen, $C_1$ to $C_{10}$ alkyl, 2-hydroxyethyl, 2-cyanoethyl, benzyl or phenyl, and (b) a group ortho to the bond to the methane carbon atom which is selected from lower alkyl, lower alkoxy, fluorine, chlorine, bromine, or butadienylene which when joined to the phenyl group forms a naphthalene ring; and the third aryl group; when different from the first two, is selected from thienyl, furyl, oxazylyl, pyridyl, thiazolyl, indolyl, indolinyl, benzoxazolyl, quinolyl, benzothiazolyl, phenyl, naphthyl, or such aforelisted groups substituted with lower alkyl, lower alkoxyl, methylenedioxy, fluoro, chloro, bromo, amino, lower alkylamino, lower dialkylamino, lower alkylthio, hydroxy, carboxy, carbonamido, lower carbalkoxy, lower alkylsulfonyl, lower alkylsulfonamide, $C_1$ and $C_{10}$ arylsulfonamido, nitro or benzylthio, and 3. an amorphous thermoplastic binder within which components (1) and (2) are dispersed, said binder having a glass transition temperature above 25° C. but below the decomposition temperature of components (1) and (2), to an activation temperature above the glass transition temperature of the binder but below the decomposition temperature of components (1) and (2), said composition being substantially free of solvent, and b. subjecting the composition, while at said activation temperature, to photoradiation of wavelength and intensity effective to induce colored image formation.

5. The process of claim 4 wherein the glass transition temperature of the binder is between 30° C. and 130° C., and the composition is heated in step (a) to a temperature of from about 20° to about 50° C. above the glass transition temperature of the binder.

6. The process of claim 4 wherein in the 2,2',4,4',5,5'-hexaphenylbiimidazole, the 2 and 2' phenyl groups are each substituted with one ortho-chloro group and the 4,4',5 and 5' phenyl groups are each unsubstituted or are each substituted with one meta-methoxy group;

the dye in the leuco form is a strong acid salt of an aminotriarylmethane of the formula

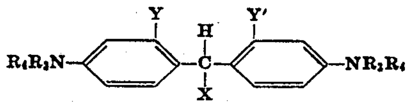

wherein $R_3$ and $R_4$ are lower alkyl or benzyl; Y and Y' are lower alkyl and X is

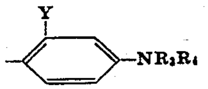

p-methoxyphenyl, 2-thienyl, phenyl, 1-naphthyl, 2,3-dimethoxyphenyl, 3,4-methylenedioxy phenyl or p-benzothiophenyl;

and the binder is selected from polyvinylacetate, poly n-propyl acrylate, poly chlorotrifluoroethylene, poly ethyl methacrylate, poly vinyl chloride, poly styrene, poly methyl methacrylate, poly methacrylonitrile, poly vinyl butyral, cellulose triacetate, ethylene/vinyl acetate copolymers, m-phenylene diamine/isophthalic acid condensation polymer, cellulose acetate butyrate, ethyl acrylate/methyl methacrylate copolymer, methyl acrylate/2-ethylhexylacrylate/methyl methacrylate copolymer, methyl acrylate/methyl methacrylate/n-butyl methacrylate copolymer; or poly(n-butyl)methacrylate.

7. The process of claim 6 wherein in the aminotriarylmethane, $K_3$ and $R_4$ are lower alkyl, Y and Y' are lower alkyl, and X is

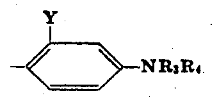

or p-chlorophenyl, and wherein the binder is poly(methyl methacrylate), methyl acrylate/2-ethylhexyl acrylate/methyl methacrylate copolymer, methyl acrylate/methyl methacrylate/n-butyl methacrylate copolymer, ethyl acrylate/methyl acrylate copolymer, poly(vinyl acetate) or cellulose acetate butyrate.

8. A process which comprises the process of claim 7, followed by the additional step of c. cooling the composition to a temperature below the glass transition temperature specified in step (a) of claim 7.

9. A process for imaging photosensitive color-forming compositions which comprises a. subjecting a composition which is substantially free of solvent and consists essentially of
   1. a 2,2',4,4',5,5'-hexaarylbiimidazole wherein each aryl group contains up to 26 carbon atoms and is selected from carbocyclic or heterocyclic aromatic moieties,
   2. at least one dye in the leuco form having one or two removable hydrogens, the removal of which forms a differently colored dye with the proviso that when the leuco form has only one removable hydrogen and the resultant dye is cationic, there is also present an acid which forms a salt with the leuco form of the dye, and
   3. a binder within which components (1) and (2) are dispersed, to photoradiation of wavelength and intensity effective to activate the hexaarylbiimidazole, b. followed by substantially immediately raising the temperature of the composition until the composition forms colored image.

10. A process which comprises the process of claim 9, followed by the additional step of c. cooling the composition to a temperature below the temperature at which the composition formed color.

* * * * *